United States Patent
Laser et al.

(10) Patent No.: US 6,303,894 B1
(45) Date of Patent: Oct. 16, 2001

(54) RESISTANCE WELDING WITH AN ELECTROCHEMICAL CAPACITOR AS THE CURRENT POWER SOURCE

(75) Inventors: Daniel Laser, Haifa; Naftali Klein, Kiryat Haim; Chaim Yarnitzky, Haifa, all of (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 09/477,801

(22) Filed: Jan. 5, 2000

(30) Foreign Application Priority Data

Jan. 5, 1999 (IL) .......................................... 17932

(51) Int. Cl.⁷ .......................... B23K 11/26; B23K 11/10; B23K 11/24
(52) U.S. Cl. .......................... 219/112; 219/91.1; 219/108
(58) Field of Search ................................ 219/108, 86.21, 219/86.41, 91.1, 112

(56) References Cited

U.S. PATENT DOCUMENTS

| 4,332,098 | * | 6/1982 | Estenevy ................................. 42/84 |
| 4,446,513 | * | 5/1984 | Clenet ................................. 363/132 |
| 4,458,132 | * | 7/1984 | Reynolds et al ..................... 219/114 |
| 4,716,267 | * | 12/1987 | Reynolds .............................. 219/113 |
| 5,272,306 | * | 12/1993 | Hirane .................................. 219/110 |
| 5,384,685 | | 1/1995 | Tong et al . |
| 5,464,453 | | 11/1995 | Tong et al . |
| 5,469,325 | | 11/1995 | Evans . |
| 5,683,598 | * | 11/1997 | Moro ................................... 219/108 |
| 5,714,733 | * | 2/1998 | Moro .............................. 219/121.61 |
| 5,737,181 | | 4/1998 | Evans . |
| 5,867,363 | | 2/1999 | Tsai et al . |
| 5,875,092 | | 2/1999 | Jow et al . |

FOREIGN PATENT DOCUMENTS

| 744 809 A2 | 3/1993 | (EP) . |
| 744 809 A3 | 3/1993 | (EP) . |
| 685 859 A1 | 5/1995 | (EP) . |

* cited by examiner

Primary Examiner—Tom Dunn
Assistant Examiner—Zidia Pittman
(74) Attorney, Agent, or Firm—Mark M. Friedman

(57) ABSTRACT

A resistance type pulse welding apparatus for workpieces, including a handpiece, a pair of electrodes mounted at the tip of the handpiece adapted for delivering weld current pulses to a workpiece to be welded, an electrochemical capacitor providing a high-current, low-voltage power source, and a triggering means located between the electrochemical capacitor and the electrodes to discharge the energy stored in the electrochemical capacitor through the electrodes upon the sensing of a threshold pressure between the electrodes, indicative of the forcing of the electrodes against the workpiece.

6 Claims, 3 Drawing Sheets

RESISTANCE WELDING WITH AN ELECTROCHEMICAL CAPACITOR AS THE CURRENT POWER SOURCE

FIELD AND BACKGROUND OF THE INVENTION

The present invention relates to resistance welding apparatus and more particularly to a lightweight, portable spot resistance welding device.

In resistance spot welding, electrode pressure is used to force the two pieces together. Heat, generated by the resistance of the workpieces to the flow of electricity, either melts the material at the interface, or at least makes it plastically adhesive. When the flow of current stops, the electrode force is further maintained for a fraction of second, while the weld rapidly cools and solidifies.

There are two types of welding equipment: Direct energy machines and stored energy machines. The stored energy mode is usually preferred because it is a more efficient and a more controlled process than the direct energy mode, and causes less extra heating, oxidation and deformation of the workpieces.

In principle, the stored energy welding machine extracts energy from the power line over a period of time and stores it in a high voltage capacitor's bank. The stored energy is discharged through a pulse transformer which converts the high voltage pulse into the required high current pulse (at low voltage) which is delivered by highly conductive cables to the welding head and passes through the workpiece. A third cable runs from the supply to the welding head and ensures that the firing switch of the discharge will close only after the two electrode are pressed together against the workpiece.

Commercial stored energy power supplies have a peak output voltage of 6 to 10 Volts and deliver up to several hundred Joules during a pulse (or two pulses) which can have a duration of several milliseconds. Typical weight of supplies range in 15 to 30 kg. Even portable battery powered light duty welding power supplies have a typical weight of about 10 kg.

Thus, no truly portable resistance welding system exists in a sense that the complete welding system can be conveniently carried and operated by the operator; or without being connected to the supply by heavy duty welding cables in the direct energy mode.

SUMMARY AND OBJECTS OF THE INVENTION

The present invention solves the deficiencies of the prior art power supplies by the application of an electrochemical capacitor as the source for the high current pulses that are required in the resistance welding process. It is based on the properties of electrochemical capacitors, especially their large electrical capacitance which enables them to store energy at low voltages and their ability to deliver this energy fast enough so it can produce sufficient heat to spot weld two metal sheets.

The invention is based on the properties of an electrochemical capacitor which is characterized by its large capacitance and energy density to serve as a power source for resistance welding. The capacitor was based on the "quasi capacitance" phenomena of the $RuO_2$ electrode in a solution of 4M $H_2SO_4$, which is described by Conway et al, "The Role and Utilization of Pseudocapacitance for Energy Storage by Supercapacitors", Journal of Power Sources, Vol. 66, 1997, 1–14, incorporated herein by reference.

Thus, the energy needed for the welding process is stored in a very compact electrical storage device which is tightly attached to the welding head where its energy can be extracted directly in the appropriate form of high current and low voltage to perform the welding job.

It is therefore an object of the present invention to provide a lightweight, compact low voltage, high-current pulse to electrodes employing an electrochemical capacitor.

BRIEF DESCRIPTION OF THE FIGURES

The invention herein described, by way of example only, with reference to the accompanying drawings, wherein.

DESCRIPTION OF THE PREFERRED EMBODIMENTS

Figure 1:
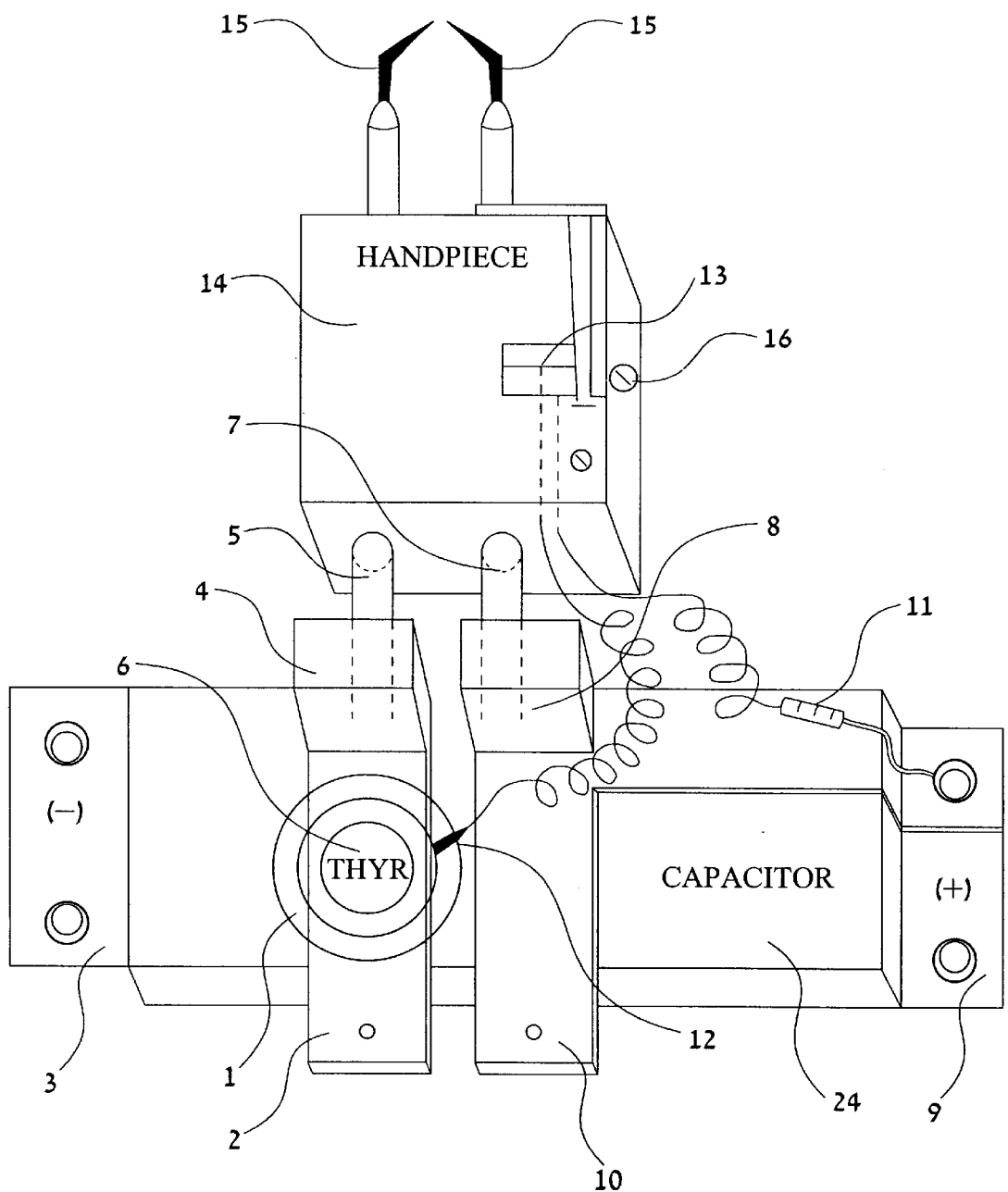
FIG. 1 shows a perspective view of the welding unit according to the present invention.
Figure 2:
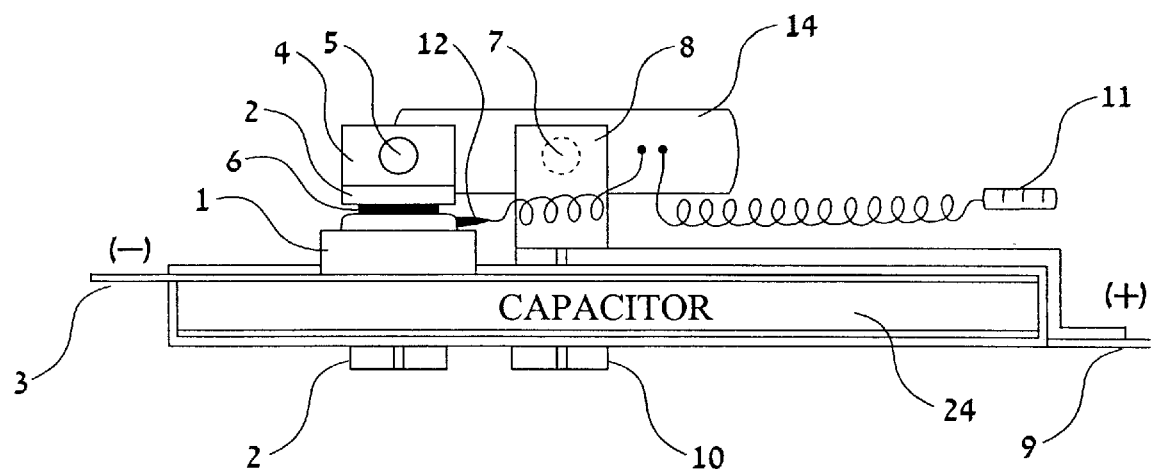
FIG. 2 shows a perspective side view of the welding unit according to the present invention.

Referring now to the Figures, wherein corresponding elements represent identical elements throughout the several views, and more particularly to FIGS. 1 and 2, the negative electrode 1 of thyristor 6 is held and pressed with an aluminum clamp 2 against an exposed area of the negative electrodes 3 of a packed electrochemical capacitor 24. A copper block 4 is attached to the end of clamp 2 which serves as the mechanical and electrical socket for the first input electrodes 5 of the handpiece, or the welding head, 14.

Electrode 5 of the handpiece 14 is shorted electrically via clamp 2 to the positive side of the thyristor 6, while the other input electrode 7 of the handpiece 14 is held by a second copper socket 8 and is shorted to the positive electrode 9 of the capacitor 24 by a second aluminum clamp 10.

Thyristor 6 is activated into its conductive state by the application of a positive voltage which resides on the positive electrode 9 of the charged capacitor 24. This voltage is applied via a 100Ω resistor 11 to the trigger input 12 of the thyristor 6 through a micro-switch 13. A commercial handpiece, such as one manufactured by Unitek, or welding head 14, contains microswitch 13 and which closes only when the electrode welding tips 15 are pressed against each other at a predetermined pressure which can be set by adjusting the screw, or other similar means 16.

Thus, the capacitor 24 is discharged by the thyristor 6 through the workpiece (not shown) only after applying pressure between the tips 15 and the establishment of the appropriate pressure for the welding process.

Figure 3:
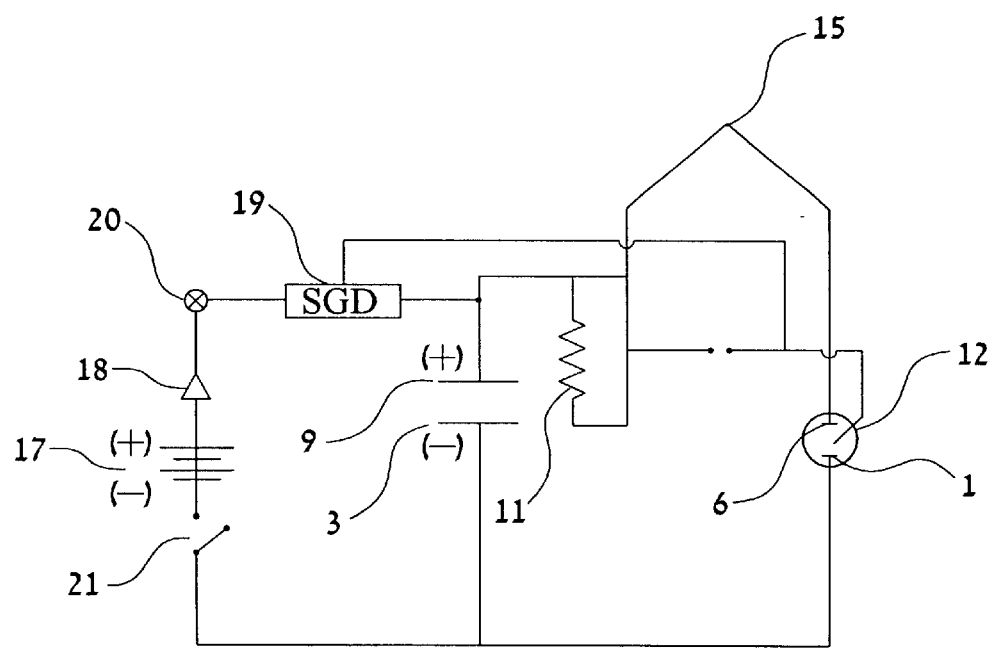
FIG. 3 shows the electrical circuitry of the welding system according to the embodiment of the invention when charged by a battery.

Referring now to FIG. 3, there is illustrated an electrical embodiment of the system of the invention including a 9–12 volt charging battery 17, a voltage regulating diode 18 coupled thereto, a MOSFET 19 between the battery and the capacitor 24, a charging flow indication bulb 20 and a charging on/off switch 21.

The 12V, 1.5 F electrochemical capacitor 24 is charged by a 12V, 4 Ahr Lead acid battery which typically weights 2.4 kg, and may be carried by a shoulder strap and connected to the capacitor through the indicating bulb 20, having a resistance of about 1 ohm. Diode 18 is placed between the battery 17 and capacitor 24 to assure that the charging potential will not exceed 12 volts.

To prevent the possibility of the discharge of the battery 17 while welding, it is disconnected from the welding unit 14 while the thyristor electrodes 1 and 6 becomes conductive. This is achieved by the MOSFET 19, which enters its cutoff as soon as the micro-switch 13 in the handpiece 14 is closed by pressing the welding electrodes against each other, activating thyristor 6.

Figure 4A:
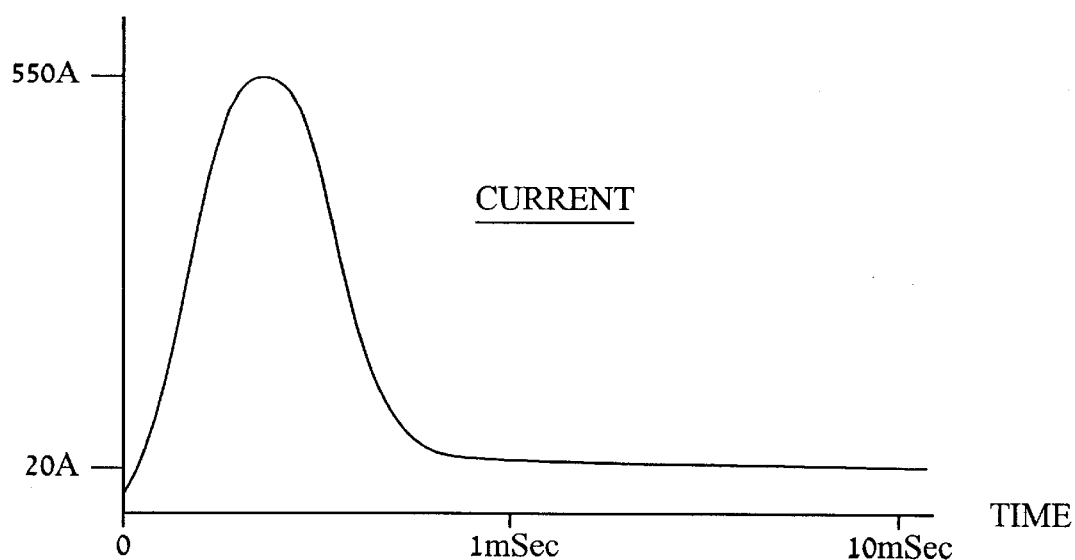
FIG. 4(*a*) and FIG. 4(*b*) shows the curves of current and voltage pulses, respectively, which are obtained during welding according to the embodiment of the invention using a 12V, 1.5 F capacitor.
Figure 4B:
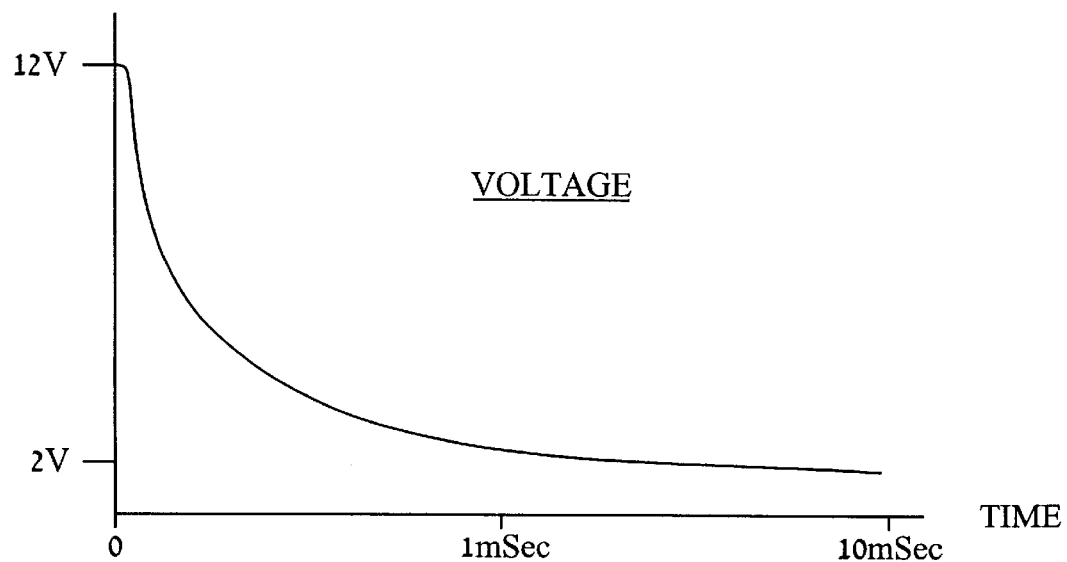

FIGS. 4(a) and 4(b) shows the current and voltage, respectively, for such a capacitor. It was found that the current for a single weld consisted of a short current pulse with a peak power of about 3000 W for about 0.5 milliseconds which was followed by a lower decaying current which flowed for the period which is compatible with the time constant of the system as long as the welding circuit remained closed.

Accordingly, there has been provided an electrochemical capacitor which weighs about 250 grams can be charged in any conventional manner and the energy which is stored in it is fed during the discharge directly to the workpieces. This eliminates the need for the large and heavy pulse current transformer currently used as the power source.

Because of the tight attachment of the electrochemical capacitor 24 to the tweezer handpiece 14 of the welder, the need for the long heavy duty welding cables which otherwise connect the handpiece to the pulse current transformer—is eliminated as well.

Thus, there has been provided a portable and completely autonomous resistance welding system in which all its components, including the charging batteries are gripped by the user's hand with a total weight of under one kilogram.

Two embodiments were built according to the following characteristics:

|  | Capacitor I | Capacitor II |
| --- | --- | --- |
| Maximum Voltage (V): | 6 | 12 |
| Electrode Geometrical Area (cm$^2$) | 100 | 50 |
| Low Frequency Capacitance (F) | 30 | 1.5 |
| ESR (mΩ) | 15 | 10 |
| Outer Dimensions: (cm): | 15 × 5X1 | 15 × 5 × 0.5 |
| Weight: (grams): | 300 | 200 |

The complete autonomous welding system, including batteries, weighs 900 gram and can be carried by hand, and can provide over 500, 20 Joules welds at a rate of a weld every second. The 6V, 15 F capacitor was recharged by a 20V, 10 A regulated power supply which was connected to the capacitor by standard 1 mm copper electrical wires, to provide an unlimited number of 30 Joule welds at a rate of a weld per 2 sec. The 12V, 1.5 F capacitor can be charged through a 2Ω, 20 W resistor by 3 C-size, 3V Li/SO$_2$ batteries connected in series and mounted thereto. It can also be recharged by 12V, 300 mA electronic charges.

It can be seen that according to these properties, the amount of stored energy in the electrochemical capacitor 24 can reach the required energy for heavy duty resistance welding machines and that welding will be efficiently and effectively accomplished.

It is estimated that a total energy of 20–30 joules is dissipated into heat at the workpieces during 10 millisecond. After several seconds of relaxation, second and third lower pulses can be obtained from the capacitor without recharging. From this it can be seen that only a fraction of the energy which is stored in the capacitor is extracted fast enough to be useful. However, this generates sufficient power to join together two pieces of iron or stainless sheets with thickness of 0.1 mm by a weld with a pull strength of about 3 kg.

The invention has been described with respect to certain preferred embodiment. Various additions and modifications within the spirit of the invention will be apparent to these of skills in relevant arts. Accordingly the scope of the invention will be limited solely to the following claims:

What is claimed is:

1. A resistance pulse welding apparatus for workpieces, comprising:

a handpiece;

a pair of electrodes mounted at said handpiece adapted for delivering weld current pulses to a workpiece to be welded;

an electrochemical capacitor providing a high-current, low-voltage power source;

triggering means located between said electrochemical capacitor and said electrodes to discharge the energy stored in said electrochemical capacitor through said electrodes upon the sensing of a threshold pressure between said electrodes, indicative of a forcing power of said electrodes against said workpiece.

2. A welding apparatus as recited in claim 1, wherein said triggering means comprises a thyristor, said thyristor activated into its conductive state upon the indication of said electrodes being forced against said workpiece.

3. A welding apparatus as recited in claim 2, further including means for adjusting the threshold pressure of said electrodes to discharge the voltage stored in said electrochemical capacitor.

4. A welding apparatus as recited in claim 1, further including a power source for recharging said electrochemical capacitor.

5. A welding apparatus as recited in claim 4, wherein said power source comprises a battery.

6. A welding apparatus as in claim 5, further including a MOSFET located between said battery and said electrodes to prevent the discharge of the battery while said electrodes are pressed against said workpiece.

* * * * *